April 23, 1957   J. B. GUTHRIE, JR   2,790,142
MISSING PULSE INDICATOR
Filed Feb. 15, 1955   2 Sheets-Sheet 1
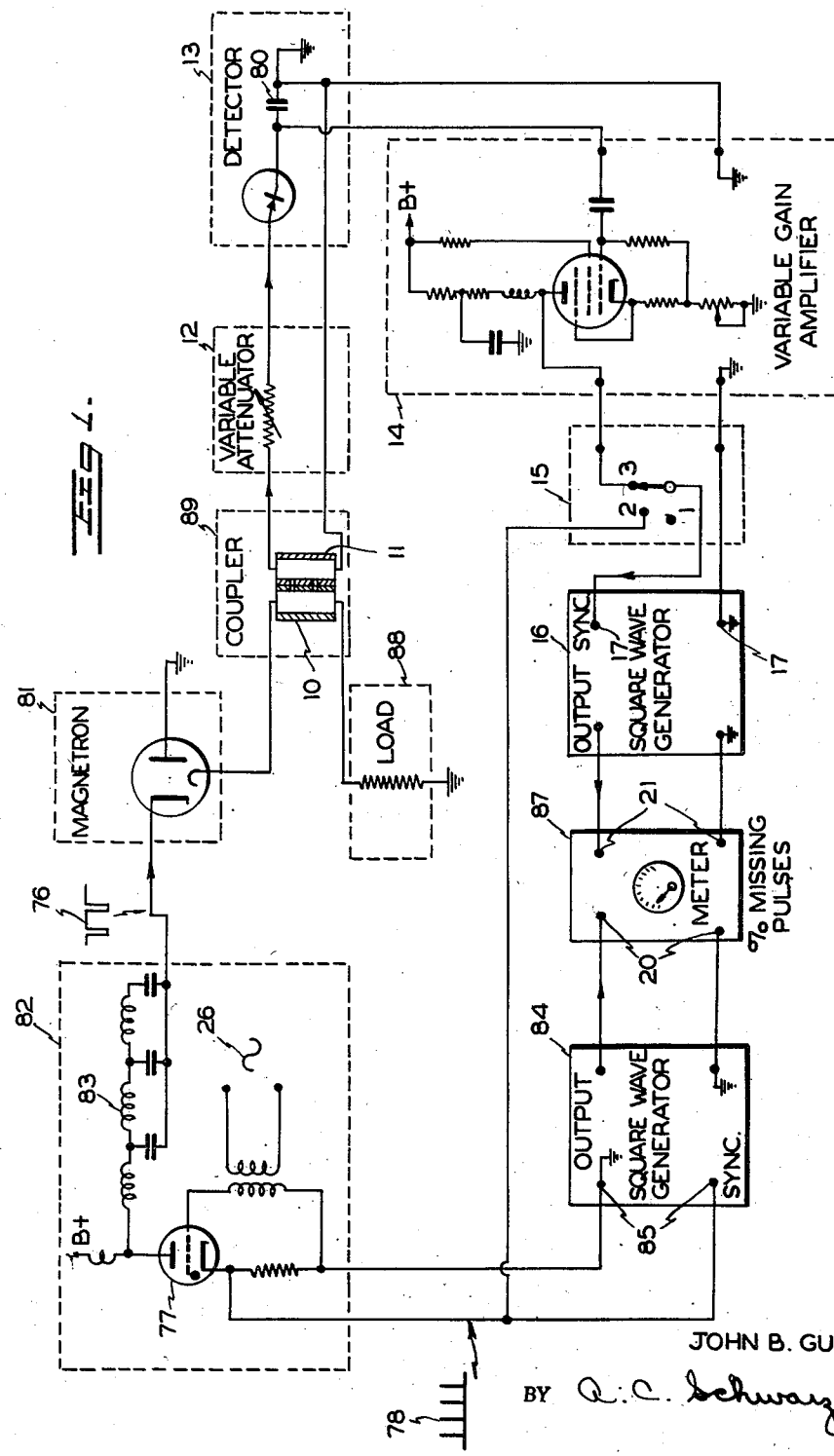
INVENTOR
JOHN B. GUTHRIE, JR
BY A.C. Schwarz, Jr.
ATTORNEY

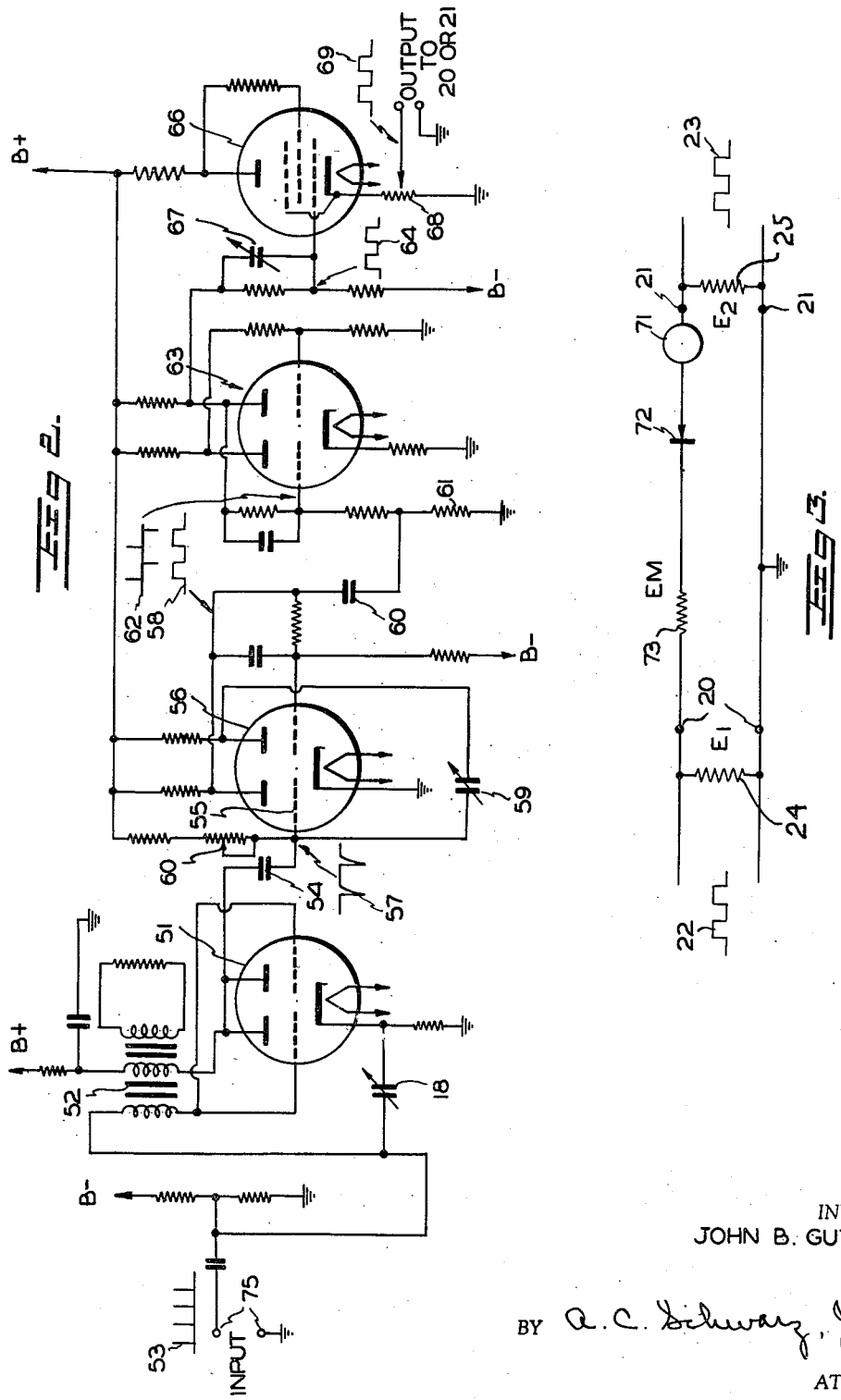

United States Patent Office 2,790,142
Patented Apr. 23, 1957

2,790,142

MISSING PULSE INDICATOR

John B. Guthrie, Jr., Greensboro, N. C., assignor to Western Electric Company, Incorporated, New York, N. Y., a corporation of New York Application February 15, 1955, Serial No. 488,379

3 Claims. (Cl. 324—57)

This invention relates to a testing or monitoring apparatus and more particularly to an apparatus for determining a characteristic of an electrical device such as for instance a magnetron tube.

In the manufacture of many electrical devices it is important that frequent checks be made of the various parts and subassemblies and that a final check be made of the complete assembly. The present invention will be described in connection with the measuring of a characteristic of a completed magnetron which for the purpose is connected to an artificial load simulating actual operating conditions. A portion of the energy is diverted from the load for testing purposes. In accordance with one embodiment of the invention an electrical impulse generator for generating two correlated impulses is provided, one of which proceeds through a translating circuit to a measuring or a comparing device and a parallel path includes the device to be tested and is also connected to the measuring or comparing device whereby irregularities in the operation of the electrical device under test may be determined.

The present device can also be used to monitor the performance of the magnetron during operation in a permanent installation. In this case, the artificial load referred to above will be the actual load, which, in the case of a radar installation will be the antenna system.

It is an object of this invention, therefore, to provide an apparatus for testing a performance characteristic of an electrical device.

A further object of the invention is to provide a convenient and accurate means of evaluating a performance characteristic of a magnetron by an immediate indication when the individual pulse power falls below the average power by a specified amount.

It is another object of this invention to determine the severity of moding, arcing and ragged spectrum in a magnetron and to be able to quantitatively determine the degree to which it occurs.

One feature of the invention is that the pulse rate of either of the compared pulses does not depend for its accuracy on any external timing means. This enhances the accuracy of the system and assures the simplest of operational adjustments.

Other objects and advantages of the invention will become apparent from the following description when considered in connection with the accompanying drawings, wherein:

Fig. 1 shows a system schematic, stages of which are partly in detail and others shown in block diagram form;

Fig. 2 is a circuit diagram of a preferred square wave generator, and

Fig. 3 is a detailed circuit schematic of the meter circuit.

Referring now to Fig. 1 it will be seen that there is shown a magnetron 81 to be tested which may be any suitable type adapted for pulse-type operation. The magnetron is triggered by a modulator circuit 82 comprising a thyratron 77 and a network 83 for shaping the thyratron plate circuit output pulses into gating pulses 76 of required wave form to fire the magnetron 81. The thyratron tube 77 is triggered by a constant frequency sine wave voltage 26 or other timing voltages of a suitable waveform. The gating pulses 76 are substantially rectangular negative pulses of short duration suitable for pulsing the magnetron used which may have typical values such as: duration, 0.5 to 5 microseconds; frequency, 200 to 800 pulses per second; amplitude, 10 to 15 kilovolts. Positive triggering pulses 78 are also generated by the thyratron and are applied to input terminals 85 of a square wave generator 84. The pulses 78 generated by thyratron 77 in its cathode circuit are correlated in frequency and magnitude to the pulses produced in its plate circuit which are subsequently shaped for firing magnetron 81. The square wave generator 84 is one which will generate a square wave pulse of variable duration and magnitude. Its duty cycle is preferably amenable to manual adjustment. The output voltage of the square wave generator is applied to terminals 20 of a meter 87.

The high frequency oscillatory pulses produced by the magnetron 81 and coupled to an artificial load circuit 88 simulating a load for which the magnetron is designed. This load 88 may also be the actual load of the magnetron when it is in a permanent installation. A portion of the magnetron output is sampled from this coupling circuit by means of a directional coupler 89. The directional coupler consists of two sections of wave guide, the electrical interconnections between the two sections being provided by holes extending through their contiguous sides. The coupler is shown in the drawing to be partially schematic and partially cross-sectional. The wave guide 10 is used as a transmission line for the load circuit. The other wave guide 11 is used as the "secondary" of the coupling device so that a sample of the output of the magnetron may be applied to an indicator. The output voltage of this directional coupler 89 at the output of wave guide section 11 is directly proportional to the output of the magnetron but it is approximately 20 decibels lower in amplitude.

A variable attenuator 12 is also advantageously in the form of a section of wave guide. It controls the amplitude of the magnetron output sample which is to be tested. It is shown on the diagram as a variable resistor although it is to be understood that any device which could be used as an insertion loss at this point in the system could be selected by one skilled in the art.

A detector 13 removes the radio frequency component from the magnetron output sample. The resulting pulse conforming to the envelope of the signal input to the detector 13 is substantially identical to the cathode circuit output of thyratron 77 in wave form but reduced in amplitude. In other words the rectified output of detector 13 will be pulses whose form is essentially identical to trigger pulses 78. The output of the detector 13 is taken from the terminals of a condenser 80 which bypasses the radio frequency components to ground.

A variable gain amplifier 14 amplifies the pulse output of detector 13 so that it becomes of the same polarity and substantially equal to the amplitude of the cathode circuit output pulses 78 generated by the modulator 82. The amplifier has a manually adjustable gain control so that the required gain may be adjusted at a desired level. The output of the amplifier 14 is applied to a square wave generator 16 at input terminal 17 when a switch 15 is in the position 3 shown in the drawing.

The square wave generators 84 and 16 are identical and are shown in the circuitry in Fig. 2. This square wave generator is a triggered generator which may produce pulses of variable durations and also of variable amplitudes. The low impedance output derived from the cathode of the final power stage 66 is amenable to gain adjustment as required.

The first stage of the square wave generator Fig. 2 is a normally cut-off blocking oscillator. It includes a parallel connected twin triode vacuum tube 51 and a plate-grid feedback circuit pulse transformer 52. Before the positive trigger pulses 53 are applied to input terminals 75, which are identical and are shown in the system schematic (Fig. 1) as terminals 85 and 17 of the square wave generators 84 and 16, respectively, the vacuum tube 51 is maintained cut-off by the B— bias voltage. On the application of the positive trigger pulses 53, a very fast on-off switching action occurs for each pulse because of the regenerative feedback effected by pulse transformer 52 and thus starts conduction in the tube 51. The duration of the conduction time depends mainly on the transformer 52 magnetizing inductance and the value of coupling capacitor 18. The third winding of transformer 52 with connections to a load resistor performs the function of damping undesired oscillations. The output pulses produced at the plates of tube 51 are coupled through condenser 54 to the grid 55 of twin triode 56. The wave form 57 of the pulse produced by blocking oscillator 51 is seen to be a negative pulse used to trigger tube 56, and has a repetition rate equal to that of pulses 53.

The second stage comprising vacuum tube 56 is a normally cut-off multivibrator. It produces a square wave pulse 58 whose width depends on the settings of "coarse" 59 and "fine" 60 width controls when triggered by the pulse from the preceding stage. The selection of the proper value of capacitance of condenser 59 together with the proper adjustment of resistor 60 establishes the width and thus the duty cycle of the pulse output of this multivibrator stage. It has been found advantageous to adjust the duty cycle of the pulse to be 50 percent of the total cycle period. The square wave 58 may be differentiated by a condenser 60 and resistor 61 as shown by the wave form 62 and applied to a third stage 63. The third stage consists of a second multivibrator having a square wave output whose frequency and duty cycle depend on the differentiated output 62 from the previous stage. The inclusion of this third stage 63 gives greater stability and better waveform to the output of a final stage described below.

This final stage of the square wave generator comprises a power amplifier 66 producing at its low impedance output a square wave pulse of variable amplitude and width occurring at the repetition rate of its input wave 58. In practice a variable condenser 67 is adjusted to produce a wave shape with an optimum leading edge. An amplitude control 68 is adjustable to produce a voltage amplitude sufficient for full scale meter deflection of meter 87 of Fig. 1 for calibrating purposes as will be explained hereinafter. This power amplifier stage is thus seen to produce a positive square-topped pulse 69 whose duration may be appreciably longer than the triggering pulse 53. As has been explained before, the preferred duration time is 50 percent of the pulse repetition rate.

The schematic diagram shown in Fig. 3 is a detailed circuit arrangement of the meter 87 shown in Fig. 1. The terminals 20 and 21 have been labelled so that a correlation of this figure and that shown in Fig. 1 may be facilitated. Meter 71 is a conventional direct current meter and detector 72 is preferably a selenium or copper oxide dry disk rectifier. Resistors 24 and 25 are actually the cathode resistors (shown at 68) of the power amplifier stage 66 shown in Fig. 2 of the two square wave generators, but are shown as in Fig. 3 for purposes of clarity. The resistor 73 is selected for the sensitivity range of the meter required. It can be seen from the drawing that the meter indication will be proportionate to the average difference in voltage between the two square wave inputs 22 and 23. Square waves 22 and 23 represent the square waves 69 produced by square wave generators 16 and 84. For example, if the square wave input 22 were identical to the square wave input 23, voltage $E_1$ across resistance 24 and $E_2$ across resistance 25 would be identical thus no current would flow through the meter. In other words, voltage $E_m$ across the meter 71 would be zero resulting in no meter indication. If on the other hand voltage 22 were sustained and voltage 23 decreased, current would then flow through the meter 71, its value depending on the calibrations priorly set. The meter scale is divided linearly between zero and full scale representing missing pulse values of 0 percent and 100 percent respectively.

The testing apparatus is placed in operation as follows. Referring to Fig. 1, switch 15 is moved to position 1. In this position the square wave generator 16 will not be receiving pulses resulting in the meter 87 receiving pulses only from the square wave generator 84. Square wave generator 84 in turn receives its triggering pulses 78 from the cathode circuit output of thyratron 77 of modulator 82. The amplitude of the square wave produced by generator 84 is adjusted to cause the meter to read full scale deflection. The switch 15 is next moved to position 2. This position places both generators 84 and 16 in circuit to simultaneously receive their respective input triggering pulses 78 from modulator 82. Since each generator is identical, the response of generator 16 can be adjusted to equal that of generator 84. The amplitude of the output of square wave generator 16 is adjusted to cause the meter to just read zero. This is the condition, referring again to Fig. 3, at which voltage $E_1$ is equal to $E_2$. Both generators 84 and 16 operate continuously under the condition of the switch in position 2. At the completion of these adjustments the apparatus is calibrated and the system is ready to be placed in testing operation.

The system is placed in its operation for the testing of missing or reduced amplitude pulses by moving switch 15 to position 3. The square wave generator 16 is then receiving its pulses from the magnetron 81 through, of course, the various component elements shown. With a magnetron 81 operating, the gain of the amplifier 14 is adjusted to cause the meter 87 to read exactly zero. The attenuator 12 is then increased a prescribed amount corresponding to the power level below which the pulses should be regarded as missing. The meter 87 will then indicate the percentage of pulses below this level. This percentage is an indication of the number of output pulses missing with respect to the number of input pulses for the magnetron under test.

Obviously, the apparatus of the instant invention can be used to monitor a magnetron installed in a permanent installation. The information afforded by this apparatus will give a constant check on the missing pulse characteristic of the magnetron at any given instant, and if the number of output pulses thereof with respect to the number of input pulses decreases below a predetermined standard, the magnetron can be immediately replaced by one that conforms to such standard.

It is to be understood that numerous other modifications of the invention as disclosed herein may be made without departing from the spirit and scope thereof.

What is claimed is:

1. An apparatus for indicating the number of pulses that are missing from the output of a pulsed magnetron with respect to the number of input pulses thereto comprising a thyratron tube having an anode, a cathode and a grid, a source of periodic voltage applied to said grid to trigger said thyratron, means to derive an output from said thyratron cathode, a pulse shaping network connected between said thyratron anode and an electrode of said magnetron to provide a suitable pulse to trigger said magnetron, an output circuit connected to said magnetron, means to tap a portion of the energy of said magnetron output, a detector, means to connect said tapped portion to said detector to eliminate the radio frequency component from said tapped portion, means to vary the amplitude of said detected tapped portion so that it is substantially similar to said output of said thyratron cathode, a pair of similar, triggered square wave generators, means to connect said detected tapped portion to the input of one of said square wave generators, means to connect said output of said thyratron cathode of the input to said other square wave generator, and means to compare the output of said square wave generators to obtain an indication of the number of output pulses missing from said magnetron with respect to the number of input pulses thereto from the pulse shaping network.

2. The combination in accordance with claim 1 wherein said means for comparing the outputs of said square wave generators comprises a balancing circuit having an output proportional to the average difference between the outputs of said square wave generators, and a voltmeter arranged to measure the output of said balancing circuit and calibrated to indicate visually the percentage of missing pulses.

3. An apparatus for indicating the number of pulses that are missing from the output of a pulsed magnetron with respect to the number of input pulses thereto comprising a source of periodic voltage, a thyratron having an anode, a cathode and a control grid, said thyratron to provide a pair of correlated output pulses from said anode and cathode when said source of periodic voltage is applied to said grid, a magnetron, a pulse shaping network connected between said thyratron anode and an electrode of magnetron to provide a suitable pulse to trigger said magnetron, an output circuit connected to said magnetron, means to tap a portion of the energy from said magnetron output, variable attenuator means for setting the power level below which a pulse is to be considered missing, means to apply said tapped portion to the input of said variable attenuator, a detector, means to connect the output of said variable attenuator to said input of said detector so that any radio frequency component of said variable attenuator output is eliminated, means to vary the amplitude of said detected pulse so that it is substantially similar to said output pulse of said thyratron cathode, a pair of similar square wave generators, means to deliver said substantially similar pulses each to an input of one of said square wave generators, a comparison means, and means to connect the output of said square wave generators to said comparison means to obtain an indication of the number of output pulses missing from said magnetron with respect to the number of input pulses thereto from the pulse shaping network.

References Cited in the file of this patent
UNITED STATES PATENTS

| | | |
|---|---|---|
| 2,213,099 | Adorjan | Aug. 27, 1940 |
| 2,618,686 | Lange | Nov. 18, 1952 |